Oct. 23, 1945.  C. A. PALMGREN  2,387,464
WELDING ELECTRODE HOLDER
Filed Oct. 18, 1943
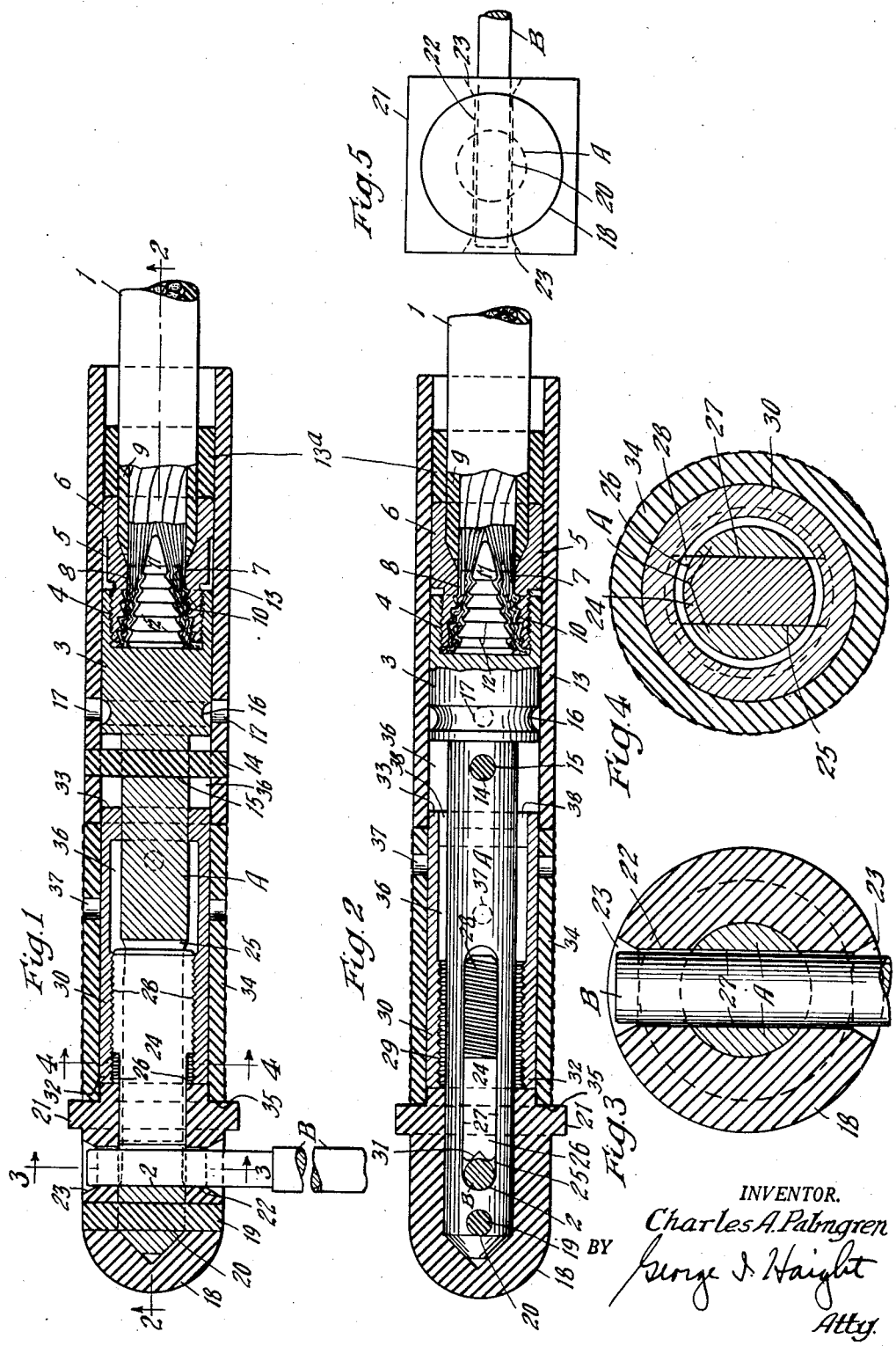
INVENTOR.
Charles A. Palmgren
BY George I. Haight
Atty.

Patented Oct. 23, 1945

2,387,464

UNITED STATES PATENT OFFICE 2,387,464

WELDING ELECTRODE HOLDER

Charles A. Palmgren, Chicago, Ill.

Application October 18, 1943, Serial No. 506,656

9 Claims. (Cl. 219—8)

My invention relates to improvements in electrode holders especially adapted for arc welding purposes.

One of the objects of the invention is to provide an electrode holder which is completely insulated with no electrical parts exposed to accidental contact, and with its electrode clamping jaws protected against becoming fouled or damaged by dirt or spatter from the arc.

A further object is to provide an electrode holder which is light in weight and convenient and comfortable for the operator to handle, which has electrode clamping means operable by one hand of the operator, and which requires no special tool to assemble or disassemble it.

A further object is the provision of an electrode holder which is especially adapted for use in under-water welding operations and which is provided with insulation highly resistant to salt water.

Other objects of the invention will appear from the description in connection with the accompanying drawing which illustrates the preferred embodiment of the invention.

Referring to the drawing,

Fig. 1 is a central longitudinal section of an electrode holder attached at the end of a suitable cable, this view being taken substantially in the plane of the electrode;

Fig. 2 is a longitudinal section on the line 2—2 of Fig. 1;

Fig. 3 is an enlarged transverse section on the line 3—3 of Fig. 1;

Fig. 4 is an enlarged transverse section on the line 4—4 of Fig. 1; and

Fig. 5 is a view of the electrode end of the structure.

The structure shown comprises in general a central cylindrical stem member A of metal, preferably brass, one end of which is attached to an electrical cable or conductor 1, and the other end of which has a transverse bore 2 for the reception of the electrode B. The cable may be secured to the holder in any suitable manner, but I prefer to use a solderless connection. The stem has a portion 3 of larger diameter, in which there is provided a threaded socket 4, for the reception of a threaded bushing 5, the outer end portion 6 of which is enlarged to substantially the diameter of the portion 3. The bushing has a central bore 7 which is tapered outwardly in both directions from an intermediate point 8 through which the bared strands of the cable 1 are inserted. The outer taper is large enough to receive the usual insulation 9 of the cable. The inner taper has its wall provided with a series of annular sharp-edged ribs 10 against which the strands of the cable are expanded by means of a tapered plug 11 which likewise has an exterior series of ribs 12. The connection of the cable to the holder is made by inserting the bared strands of the cable through the bore of the bushing as far as the inner end, flaring the strands and inserting the tapered plug into the center of the flared strands, and then screwing the bushing into the socket 4. The end of the plug bears against the bottom wall of socket 4, and as the bushing is screwed up tight the strands are clamped tightly between the ribs 10 and 12.

These parts are enclosed within a tubular sheathing 13 of insulating material which, as shown in the drawing, is extended to overlap the cable. Within this overlapped portion of sheathing, a ring 13a of insulation is provided around the cable to protect the otherwise exposed end of the bushing 6. The interior diameter of the insulating sheathing is substantially that of the enlarged portion 4 and the bushing member 5 so as to fit snugly thereon. It is held in place by a transverse plug 14 of insulating material which extends through a diametrical hole 15 in the stem member A. The enlarged portion 4 of the stem has an annular groove 16 which registers with a series of holes 17 in the insulating member for the purpose of assisting in dissipating heat which may be conducted from the electrode back through the stem member in order to maintain the handle portion of the holder of the device cool.

The other end of the stem A is enclosed in a thick-walled cap 18 of insulating material which is fastened in place by a plug 19 of insulating material extending through a transverse hole 20 in the stem to a point flush with the outer surface of the cap. This insulating cap is substantially the same diameter as the handle sheathing 13 and has a rounded end portion. The cap extends onto the stem beyond the electrode opening and has a portion 21 which is made rectangular in shape so that the holder may be laid down and held from rolling. The openings 22 in the insulating cap through which the electrode extends are flared at their outer ends 23 so as to facilitate the entrance of the electrode into the holder.

The transverse bore 2 in the stem forms one of the jaws for making suitable electrical contact with the electrode and for clamping the electrode in the holder. The other clamping jaw 24 for the electrode is a sliding jaw which moves longitudinally of the stem within an elongated slot 25 in the stem. This slot is diametrically disposed in the stem and is of substantially the width of the bore 2. Its walls merge with the wall of the bore 2 and guide the movable jaw 24 toward and from the electrode. The movable jaw 24 is an elongated member having opposite rounded edges 26 and flat parallel side walls 27 spaced apart to fit between the parallel walls or faces of the slot 25. Both the slot 25 and the movable jaw member extend inwardly of the stem a considerable distance beyond the cap, and the rounded edges are provided with threads 28 which are engaged by the internal threads 29 of a rotary sleeve or barrel 30 for imparting longitudinal movement to the movable jaw member. These threads are left-handed so that right-handed rotation of the sleeve moves the jaw outwardly to clamp the electrode in the holder. The end of the movable jaw is provided with a V-shaped notch 31 so as to provide a biting contact with the electrode and also to enable the holder to grip electrodes of different diameters.

The rotary sleeve 30 is a tubular member concentrically disposed with respect to the stem member A and positioned between the cap and the end of the handle sheathing 13. Its outer end 32 bears against the inner end of the cap member 18 and its inner end 33 telescopes into the end of the insulating member 13. The inner end portion of the sleeve is thickened to the diameter of the stem member A, so that the inner end of the rotary sleeve will have a suitable bearing upon said stem member A. The rotary sleeve is surrounded by a tubular insulating sheathing 34 which is shrunk onto the rotary sleeve and which provides an insulating handle by which the operator may rotate the sleeve to actuate the jaw. This insulating handle 34 is of substantially the same diameter as the insulating handle 13, and its exterior surfaces are suitably knurled or fluted so that the operator can manipulate the jaws with one hand; that it, the operator can, by grasping the handle 13 with one hand, utilize his thumb to rotate the member 34. The member 34 is held against lengthwise movement by the handle 13 against the end of which the inner end of the member 34 abuts. The outer end of the member 34 is telescoped with the reduced end portion of the cap and abuts the shoulder 35 formed thereby.

Since both the insulating handle 13 and the rotary member 34 are of larger diameter than the stem member A, annular chambers 36 are provided around the stem and within the structure. The rotary member 34 and the sleeve 30 are therefore provided with a series of vent holes 37, and the thickened end 33 of the sleeve is provided with longitudinal openings 38 so as to permit the circulation of air within said chambers for the purpose of dissipating the heat and thereby assist in maintaining the handle portion of the holder in a cooler condition.

It will thus be seen that I have provided an electrode holder which is completely insulated and protected against accidental electrical contact with any external object so that the holder cannot be grounded by such contact. The holder is particularly adapted to be used in submerged welding operations, and while water can get into the interior through the electrode opening it can have no effect in interfering with the operation of the movable jaw parts. Water can enter the interior also through the vent openings 37, but these openings will permit the escape of the evaporating water after the torch has been removed from submergence.

I claim:

1. In an electrode holder of the class described, the combination of a body member having a transverse bore at one end for holding an electrode, and having an elongated longitudinal slot in said body member merging with said electrode bore, an electrode clamping jaw in said slot movable toward and from the electrode bore, a rotary tubular sleeve member surrounding said slot and movable jaw, and having internal threaded connection with said movable jaw for actuating the jaw.

2. In an electrode holder of the class described, the combination of a body member having a transverse bore at one end for holding an electrode, and having an elongated longitudinal slot in said body member merging with said electrode bore, an electrode clamping jaw in said slot movable toward and from the electrode bore, a rotary tubular sleeve member surrounding said slot and movable jaw and having threaded connection with said movable jaw for actuating the jaw, a tubular insulating handle member enclosing said body beyond the slot, an insulating cap enclosing the other end of said body member and having a transverse bore registering with said electrode bore, and a rotary insulating tubular member intermediate the cap and handle member and enclosing said rotary jaw actuating sleeve.

3. In an electrode holder of the class described, the combination of a body member having a fixed electrode clamping jaw and a movable electrode clamping jaw within said body member, and tubular insulating sheathing of substantially uniform diameter completely enclosing said body member and jaws, and comprising a fixed handle section, a fixed end cap section, and a rotary intermediate section in end abutting relation to said cap and handle sections, said intermediate rotary section surrounding said movable jaw and having internal threaded connections with said movable jaw for shifting the movable jaw upon the rotation of said rotary section.

4. In an electrode holder of the class described, the combination of a body member having a fixed electrode clamping jaw at one end and a movable electrode clamping jaw within said body member, and tubular insulating sheathing of substantially uniform diameter completely enclosing said body member and jaws, and comprising a fixed handle section, a fixed end cap section surrounding said jaws and having an opening registering with the jaws, and a rotary intermediate section in end abutting relation to said cap and fixed sections, said intermediate rotary section surrounding said movable jaw and having internal threaded connections with said movable jaw for shifting the movable jaw upon the rotation of said rotary section, said cap section having an enlarged rectangular portion with straight edges for preventing the holder from rolling upon a surface.

5. In an electrode holder of the class described, the combination of a cylindrical metallic stem member having an elongated transverse slot therethrough adjacent one end, a longitudinally slidable jaw member in said slot for clamping an electrode between itself and one end of said slot, a rotary tubular sleeve concentrically disposed on said stem member and surrounding said slot and slidable jaw, and having internal threaded connection with said slidable jaw for actuating said slidable jaw upon the rotation of said sleeve member, and tubular insulating material completely enclosing said stem member and comprising a handle section secured to said stem member at one end thereof, an end cap section secured to the other end of said stem member having openings registering with said slot for the reception of the electrode, and a rotary intermediate section secured to said rotary sleeve and disposed in end abutting relation to said handle and cap sections.

6. In an electrode holder of the class described, the combination of a cylindrical metallic stem member having an elongated longitudinally disposed transverse slot terminating adjacent one end, and having a handle section at its other end, a longitudinally slidable jaw member in said slot for clamping an electrode between itself and the terminal end of said slot, a rotary tubular sleeve concentrically disposed on said stem member intermediate said terminal end and said handle section and surrounding said slot and slidable jaw, and having threaded connection with said slidable jaw for actuating said jaw upon the rotation of said sleeve member, and tubular insulating material completely enclosing said stem member and comprising a handle section secured to said stem member, an end cap section secured to said stem member having openings registering with said slot for the reception of the electrode, a rotary intermediate section secured to said rotary sleeve in end abutting relation to said handle and cap sections, and means at the other end of said stem member and within said insulating handle section for connection with an electrical cable.

7. In an electrode holder of the class described, the combination of a cylindrical metallic stem member having an elongated transverse slot therethrough adjacent one end, a longitudinally movable jaw member in said slot for clamping an electrode between its end and one end of said slot, a rotary tubular sleeve concentrically disposed on said stem member and surrounding said slot and movable jaw, and having threaded connection with said movable jaw for actuating said movable jaw upon the rotation of said sleeve member, and tubular insulating material of substantially uniform diameter completely enclosing said stem member and comprising a handle section secured to said stem member at one end thereof, an end cap section secured to the other end of said stem member having openings registering with said slot for the reception of the electrode, and a rotary intermediate section secured to said rotary sleeve in end abutting relation to said handle and cap sections, said insulating handle section and rotary section being annularly spaced from said stem member to form air chambers and having ventilating openings communicating with said air chambers.

8. In an electrode holder of the class described, the combination of a cylindrical metallic stem member having a transverse elongated slot therethrough with parallel flat side walls and a rounded end for the reception of an electrode, a longitudinally movable jaw member in said slot and having parallel faces slidable upon the parallel flat walls of said slot and having screw threads on its edges projecting beyond the slot, a tubular sleeve surrounding said movable jaw and mounted to rotate on the longitudinal axis of said stem member and having interior screw threads engaging the threads on the edges of said jaw member for actuating said movable jaw member upon the rotation of said tubular sleeve, and a tubular sheathing of insulating material completely enclosing said stem member and having a section secured to and rotatable with said rotary sleeve.

9. In an electrode holder of the class described, the combination of a cylindrical metallic stem member having a handle section at one end and having a transverse elongated slot therethrough with parallel flat side walls with a terminal end adjacent the other end of said stem member for the reception of an electrode, a longitudinally movable jaw member in said slot having parallel faces slidable upon the parallel flat walls of said slot and having screw threads on its edge projecting beyond the slot, and a rotary tubular sleeve intermediate said terminal end and said handle section and surrounding said movable jaw and mounted to rotate on the longitudinal axis of said stem member and having interior screw threads engaging the threads on the edges of said jaw member for actuating said movable jaw member upon the rotation of said tubular sleeve.

CHARLES A. PALMGREN.